US007007135B2

(12) United States Patent
Koo et al.

(10) Patent No.: US 7,007,135 B2
(45) Date of Patent: Feb. 28, 2006

(54) MULTI-LEVEL CACHE SYSTEM WITH SIMPLIFIED MISS/REPLACEMENT CONTROL

(75) Inventors: Keong-Hoon Koo, Yongin-shi (KR); Jin-Cheon Kim, Yongin-shi (KR)

(73) Assignee: Samsung Electronics Co., Ltd., (KR)

( * ) Notice: Subject to any disclaimer, the term of this patent is extended or adjusted under 35 U.S.C. 154(b) by 134 days.

(21) Appl. No.: 10/094,261

(22) Filed: Mar. 8, 2002

(65) Prior Publication Data

US 2002/0194431 A1   Dec. 19, 2002

(30) Foreign Application Priority Data

Jun. 16, 2001   (KR)   ............................... 2001-34187

(51) Int. Cl.
*G06F 12/00*   (2006.01)
(52) U.S. Cl. ...................................... 711/122; 711/156
(58) Field of Classification Search ................ 711/119, 711/122, 141, 144, 133, 199, 156
See application file for complete search history.

(56) References Cited

U.S. PATENT DOCUMENTS 5,729,712 A * 3/1998 Whittaker .................... 711/122
6,000,015 A * 12/1999 Whittaker .................... 711/134

OTHER PUBLICATIONS

Cache Directory for Least Recently Used Replacement Algorithm, IBM Technical Disclosure Bulletin, vol. 23, No. 10, Mar. 1, 1981, pp 4544-4545.*
"Computer Architecture a Quantitative Approach," Memory-Hierarchy Design, pp. 380-383.

* cited by examiner

*Primary Examiner*—Pierre M. Vital
(74) *Attorney, Agent, or Firm*—Mills & Onello LLP (57) ABSTRACT

A multi-level cache system includes a primary cache and a secondary cache that is accessed by a processor later than the primary cache. If the secondary cache is full with data when the processor misses the access to the primary and secondary cache memories, data stored in the secondary cache must be routed to a main memory. In this case, to satisfy the inclusion property of cache, the data migrating to the main memory from the secondary cache is present in the secondary cache, not in the primary cache. The multi-level cache system does not need to access the primary cache to select the data in the secondary cache but not in the primary cache. Thus, it simplifies a logical composition for controlling the miss/replacement, and shortens an operation time therein.

9 Claims, 10 Drawing Sheets

SIMPLE CACHE MISS

MULTI-LEVEL CACHE SYSTEM WITH SIMPLIFIED MISS/REPLACEMENT CONTROL

RELATED APPLICATION

This application relies for priority upon Korean Patent Application No. 2001-34187, filed on Jun. 16, 2001, the contents of which are herein incorporated by reference in their entirety.

FIELD OF THE INVENTION

The present invention generally relates to multi-level cache systems and, more specifically, to multi-level cache systems employing set-associative cache memories as second caches.

BACKGROUND OF THE INVENTION

Cache memories, which are common random access memories (RAMs) operable at high frequency, are used in computer systems to enhance data processing efficiency; they are accessible by central processing units (CPUs) more than general memories (e.g., dynamic RAMs). Data frequently accessed by CPUs are stored in the cache memories in order to save data (or signal) transmission times.

A CPU directly accesses a cache memory without using a data-conveying device such as an external memory management unit. As a result, the cache memory is usually positioned at a place physically adjacent to the CPU in order to shorten signal transmission times. An operating feature of a data RAM, including cache memories, in a microprocessor (e.g., 'Alpha AXP 21064 Microprocessor') has been disclosed at pp. 380~383 of "Computer Architecture a Quantitative Approach" published by Morgan Kaufman Publishers Inc., in 1996, and written by David A. Paterners and John L. Hennessy.

Figure 1:
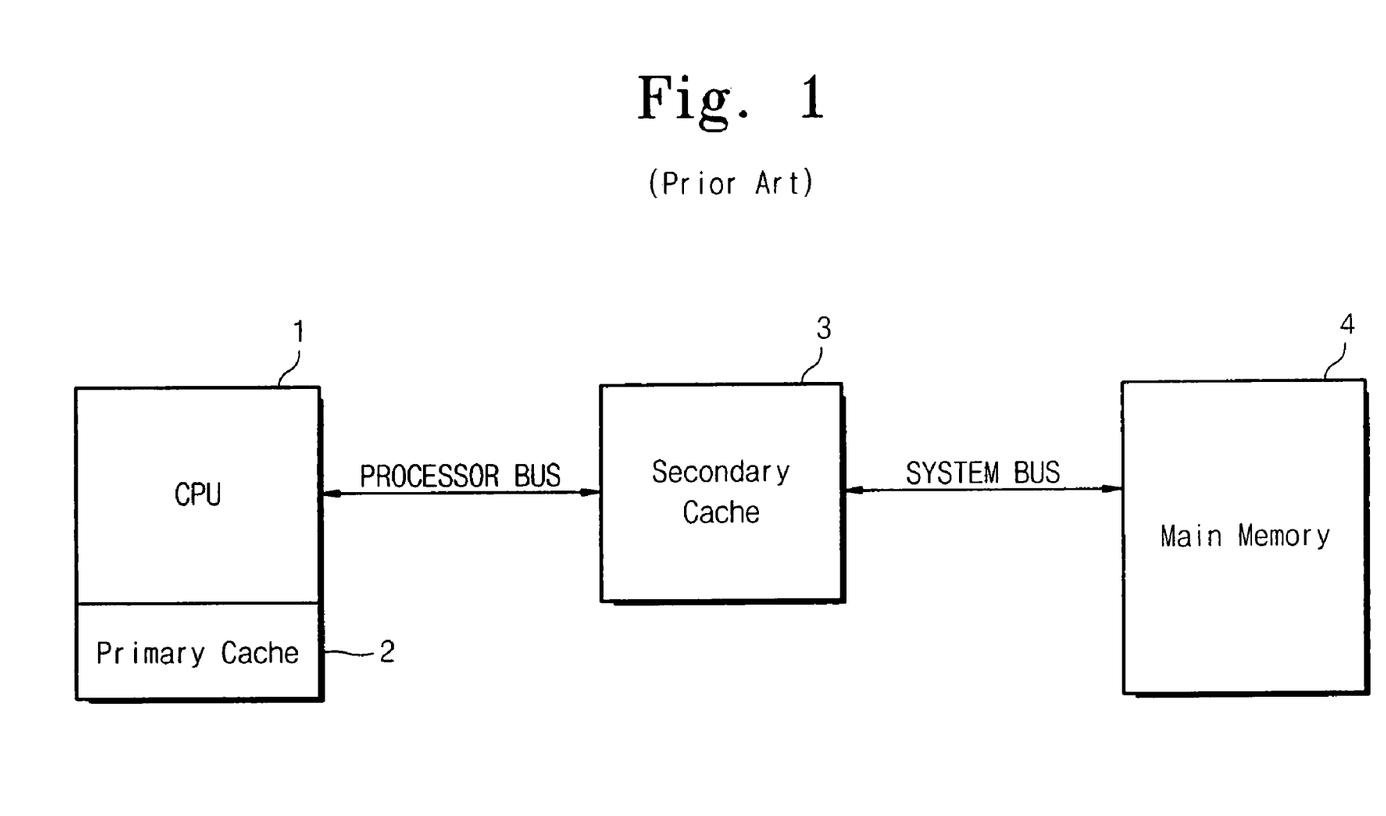
FIG. 1 is a block diagram of typical memory architecture in a computer system.

FIG. 1 shows a typical form of hierarchical memory composition. A processor (e.g., CPU) 1 obtains desirable data by accessing a primary cache (first-level cache or L1) 2, a secondary cache (second-level cache or L2) 3, and a main memory 4, in sequence. Since the secondary cache 3 is accessed by the processor 1 later than the primary cache 2, the composition shown in FIG. 1 is disadvantageous in increasing the number of bits or in enhancing latency performance thereof.

Figure 2:
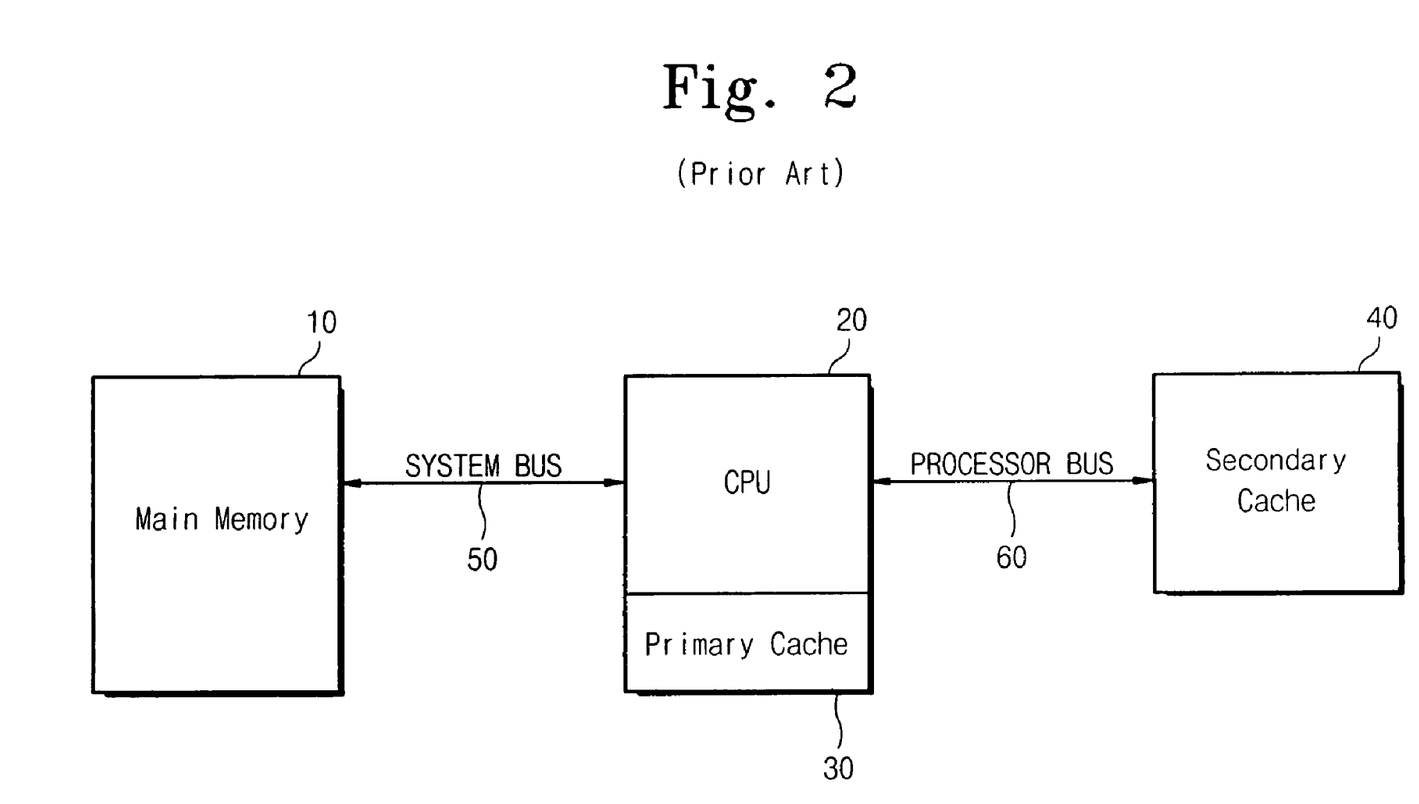
FIG. 2 is a block diagram of memory architecture in which a main memory and a secondary cache are accessible simultaneously.

FIG. 2 illustrates another hierarchical memory architecture which has the capability of simultaneous access of a main memory and a secondary cache. A CPU 20 is connected to a main memory 10 through a system bus 50, and to a secondary cache 40 through a processor bus 60. The architecture shown in FIG. 2 is advantageous to extend the number of bits transferred because the CPU can access the main memory 10 and the secondary cache 40 simultaneously, and to improve a latency condition because the secondary cache 40 is utilized as a backup memory for a primary cache (or L1 cache) 30.

However, since data stored in the primary cache 30 are not always present in the secondary cache 40, a procedure must be performed to check whether or not data assigned to the primary cache 30 are present in the secondary cache 40 before removing the data from the primary cache 30. Therefore, logical composition for data replacement becomes complicated.

There has been proposed a set-associative cache memory in which memory locations are segmented into a plurality of groups or banks in order to increase a hit rate therein. The groups or the banks are also called sets or ways.

A recent trend of semiconductor manufacturing processes has been promoted to integrate a secondary cache on a microprocessor chip as well as a primary cache. In the case of embedding a secondary cache in a microprocessor chip together with a primary cache, it is possible to enhance overall performance of a chip because of a prominent increase in the number of data bits accessible between the secondary cache and the microprocessor chip. Nevertheless, hit rate may be reduced because the embedded secondary cache sizes up to an areal limit contrary to an external one. While changes are being implemented to increase the number of sets in the set-associative cache memory in order to compensate for the degraded hit rate due to the reduced size of the embedded secondary cache on the microprocessor chip, increasing the number of sets causes block replacement logic to be complicated and circuit area to be large.

SUMMARY OF THE INVENTION

It is, therefore, an object of the present invention to provide a multi-level cache system employing a set-associative cache capable of increasing the number of sets without enlarging circuit size.

It is another object of the invention to provide a multi-level cache system employing a set-associative cache containing a more simple logic composition for replacing data.

The invention is directed to a multi-level cache system which includes a primary cache for storing tag addresses and data; and a secondary cache being accessed by a processor later than the primary cache. The secondary cache includes a data memory for storing data in a plurality of data sets and a tag memory for storing tags in a plurality of tag sets. Each tag set includes a field for storing the tags, a field for storing first information representing validity of corresponding data stored in the data memory, and a field for storing second information representing whether or not the corresponding data is stored in the primary cache. The cache system also includes a control logic circuit for conducting a control operation with reference to the first and second information when an access by the processor is in a miss state for the secondary cache.

In one embodiment, each of the tag sets further comprises a plurality of tag lines, and each of the data sets comprises a plurality of data lines that correspond to the tag lines, the lines corresponding between the tag and data sets being designated by the same index address. Further, each of the tag sets generates a hit/miss signal after comparing a tag provided from the processor with the tag stored in the line designated by the index address, and a hit/miss signal.

The control logic circuit can determine a cache miss when the hit/miss signals are all in a miss state.

In one embodiment, the secondary cache further comprises counters, corresponding to the tag lines, for counting the number of valid data stored in the data lines corresponding to the index addresses.

The control logic circuit can select data stored in the data memory and not in the primary cache as replaceable data with reference to the second information in a cache miss condition and if the counter is saturated.

By means of the control logic circuit, new data is written in the data line storing invalid data among the data of the data memory, with reference to the first information, in a cache miss condition and if the counter is not saturated.

Each of the first and second information is composed of 1-bit binary data. The first information is logical 1 when the corresponding data of the data memory is valid, or logical 0 when the corresponding data of the data memory is invalid. The second information is logical 1 when the corresponding data of the data memory is present in the primary cache, or logical 0 when the corresponding data of the data memory is absent in the primary cache.

The secondary cache is composed of a set-associative architecture. The primary cache comprises: a data memory for storing data corresponding to the tag; and a tag memory for storing tags, including a field for storing the tags and a field for storing information representing validity of corresponding data stored in a data memory.

The foregoing features and advantages of the invention will be more fully described in the accompanying drawings.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIGS. 4A through 6C show situational conditions of the primary and secondary cache memories during an operation of the multi-level cache system, according to an embodiment of the invention, in which:

DESCRIPTION OF THE PREFERRED EMBODIMENT

In the following description for purposes of explanation, specific numbers, materials and configurations are set forth in order to provide a thorough understanding of the present invention. However, it will be apparent to one skilled in the art that the present invention may be practiced without the specific without the specific details. In other instances, well-known systems are shown in diagrammatic or block diagram form in order not to obscure the present invention.

Figure 3:
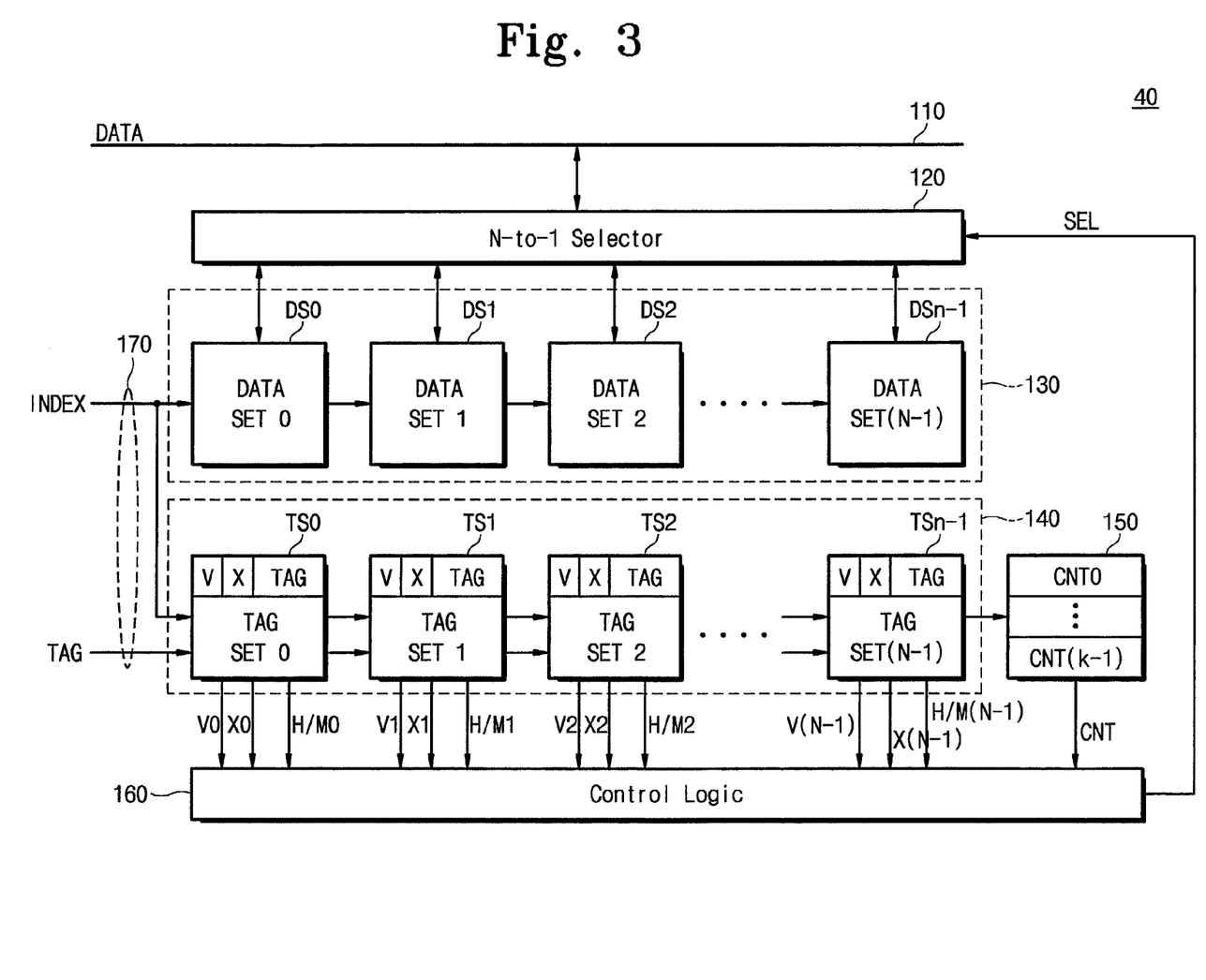
FIG. 3 is a block diagram illustrating a secondary cache employed in a multi-level cache system according to the invention.

FIG. 3 illustrates functional construction of a secondary cache employed in a multi-level cache system according to a preferred embodiment of the invention. Referring to FIG. 3, the secondary cache 40 includes N-way set-associative cache memory, where N is a positive integer. The secondary cache 40 includes an N-to-1 selection circuit 120, a data RAM 130, a tag RAM 140, and a control logic circuit 160. The data RAM 130 is segmented into data sets DS0~DSn−1 of quantity N, and the tag RAM 140 is segmented into N-numbered tag sets TS0~TSn−1 corresponding to the data sets DS0~DSn−1. Each of the data and tag RAMs, 130 and 140, is made of a static RAM. The secondary cache 40 is also coupled to a data bus 110, a counter array 150, and an address bus 170.

The tag sets TS0~TSn−1 are associated with a plurality of lines or blocks, and the data sets DS0~DSn−1 are associated with a plurality of lines or blocks which correspond to the lines of the tag sets and which store data. Index addresses INDEX are applied to the data and tag RAMs 130 and 140 in common to access the memories simultaneously, while tag addresses TAG are applied only to the tag RAM 140. The index and tag addresses, INDEX and TAG, are supplied from a processor such as a central processing unit (e.g., the CPU 20 of FIG. 1), a digital signal processor, or a microcontroller unit.

Each of the data sets DS0~DSn−1 has a valid status bit Vi (i=one of 0~n−1) and an exclusive status bit Xi (i=one of 0~n−1). The valid status bit Vi represents whether or not data stored in the corresponding data set is valid. Vi of logical 1 means that a tag address stored in a data set corresponding thereto is valid at present, while Vi of logical 0 means that a tag address stored in a data set corresponding thereto is valid at present. The exclusive status bit Xi represents whether or not data stored in a data set corresponding thereto is present in the primary cache 30. Xi of logical 1 means data stored in a corresponding data set does not exist in the primary cache 30, while Xi of logical 0 means data stored in a corresponding data set is present in the primary cache 30.

Fields for storing the tag addresses TAG is constructed in the structure of a content-addressable memory (CAM). Each of the tag sets TS0~TSn−1 generates a hit/miss signal H/Mi (i=0, 1, 2, . . . , or n−1) at a high level (logical 1), which means a state of "cache hit", when the tag address TAG from the CPU 20 agrees with one stored therein. On the contrary, if the tag address from the CPU 20 does not agree with one stored therein, a corresponding one of the tag sets generates the hit/miss signal H/Mi at a low level (logical 0) that means a state of "cache miss".

The counter array 150 is composed of plural counters corresponding to the tag sets TS0~TSn−1. The index address INDEX provided from the CPU 20 selects an alternative one of the counters, and then the selected counter is conductive to carry out a counting operation. Counting values from a selected counter in the counter array 150 are applied to the control logic circuit 160. The counters are used to count the number of valid data bits stored in the data RAM.

The control logic circuit 160, for conducting an overall operation in the secondary cache, generates a selection signal SEL to designate one of the data sets DS0~DSn−1 in response to the status bits Vi and Xi and hit/miss signals H/M0~H/Mn−1 from the tag sets TS0~TSn−1, and counting signals from the counter array 150.

The N-to-1 selector 120 is used to interface between the data bus 110 and the data RAM 130, by which data is written into one of the data sets DS0~DSn−1 of the data RAM 130 or data is read out of the data sets DS0~DSn−1 of the data RAM 130.

Figure 4A:
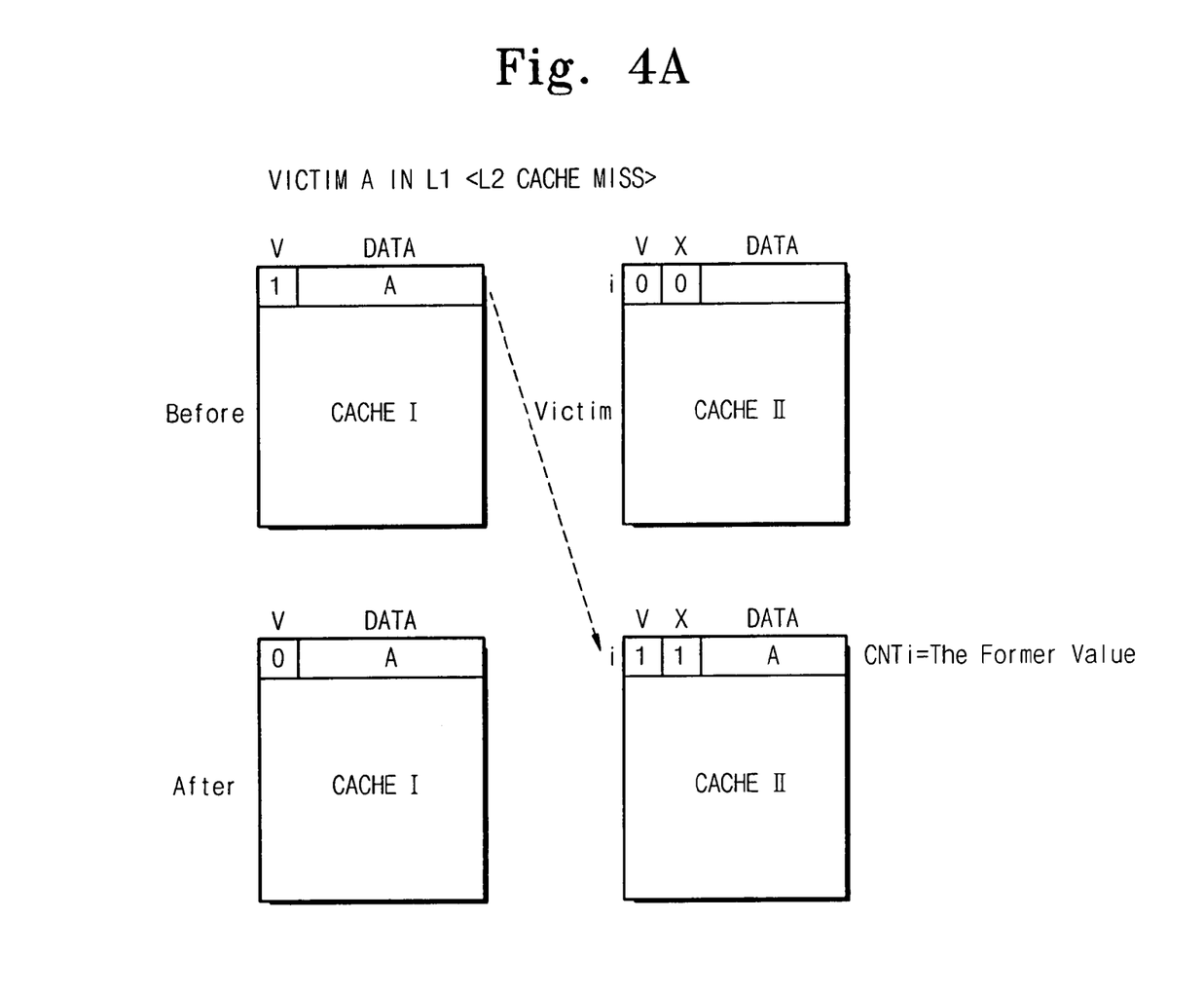
FIG. 4A illustrates the case in which a tag address stored in the primary cache (CACHE I) is not present in the secondary cache (CACHE II) when the tag address is about to move into the secondary cache.
Figure 4B:
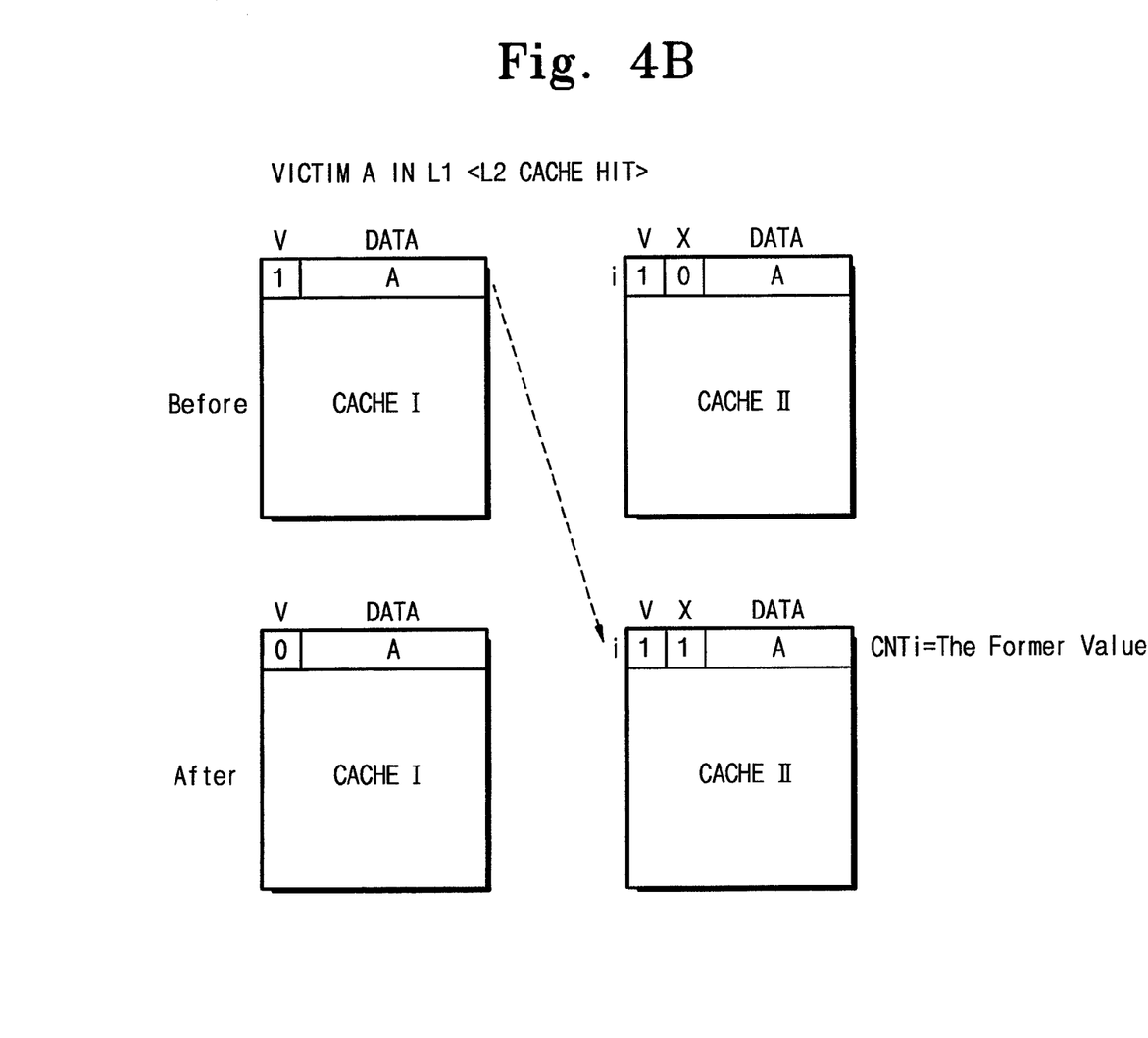
FIG. 4B illustrates the case in which a tag address stored in the primary cache (CACHE I) is present in the secondary cache (CACHE II) when the tag address is about to move into the secondary cache.

Operations of replacement for the second cache 40 in the set-associative architecture will now be described in conjunction with FIGS. 4A, 4B, 5, and 6A~6C. For convenience of description, the primary and secondary caches are referred to as CACHE I and CACHE II, respectively. FIGS. 4A and 4B shows states of the primary (CACHE I) and secondary (CACHE II) caches in a victim operation mode. The victim mode is active in the case in which CACHE I is full with data or that data are removed from CACHE I. In FIGS. 4A~6C, the valid status bit Vi and its corresponding data A, B, or C are simultaneously represented on a single line (or block).

First, when the data A stored in CACHE I is absent in CACHE II, referring to FIG. 4A, the valid data A (Vi=1) is transferred to a line (or block) having invalid data in CACHE II, among lines assigned with the index address INDEX. Then, the valid status bit Vi of CACHE I becomes 0, and Vi of CACHE II is 1. Now, as the data A is absent in CACHE I, the exclusive status bit Xi of CACHE II is set to 1. In this case, a counter CNTi corresponding to the i'th line of CACHE II holding the data A maintains the former value, because the data A is dealt with as backup from CACAHE I to CACHE II, and not to be newly applied to CACHE II from the main memory 10.

On the other hand, when the data A stored in CACHE I is present in CACHE II, referring to FIG. 4B, the data A is overlapped on a line of a data set which initially had the data A. Then, the valid status bit Vi of CACHE I becomes 0, and Vi of CACHE II is 1. As the data A is absent in CACHE I, the exclusive status bit Xi of CACHE II is set to 1. In this case, a counter CNTI corresponding to the i'th line of CACHE II holding the data A maintains the former value also, because the data A is dealt with as backup from CACAHE I to CACHE II, not to be newly applied to CACHE II from the main memory 10.

Figure 5:
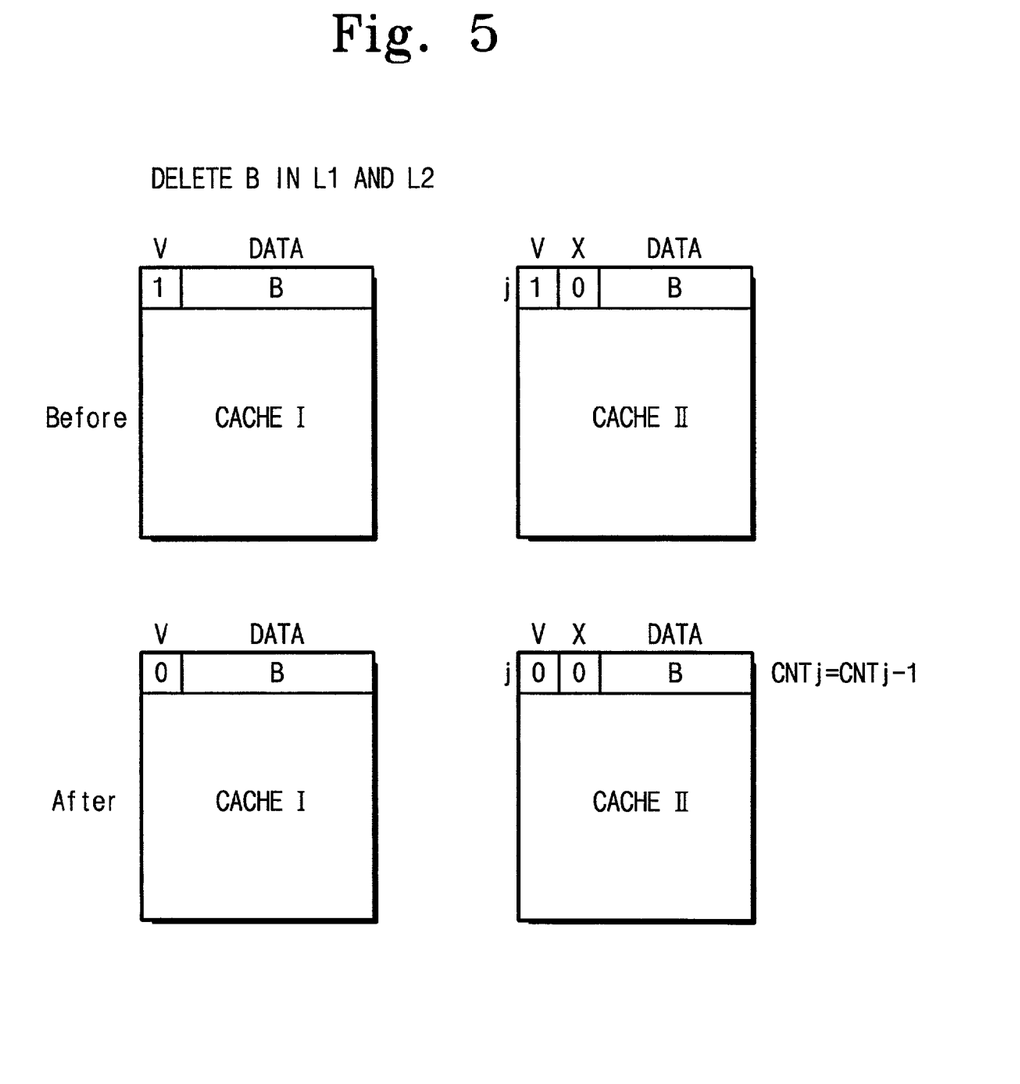
FIG. 5 illustrates the case in which tag addresses are removed from the primary and secondary cache memories.

When the data B stored in not only CACHE I but also CACHE II is to be removed therefrom, referring to FIG. 5, the valid status bits Vi and Vj, corresponding to the data B in CACHE I and CACHE II, all become 0. The data B is stored at the i'th line in CACHE I while at the j'th line in CACHE II. The exclusive status bit Xj of CACHE II also becomes 0. After removing the data B from CACHE II, a counter CNTj corresponding to the j'th line of CACHE II holding the data B generates a counting signal decreasing by 1 in binary value (CNTj=CNTj−1).

Figure 6A:
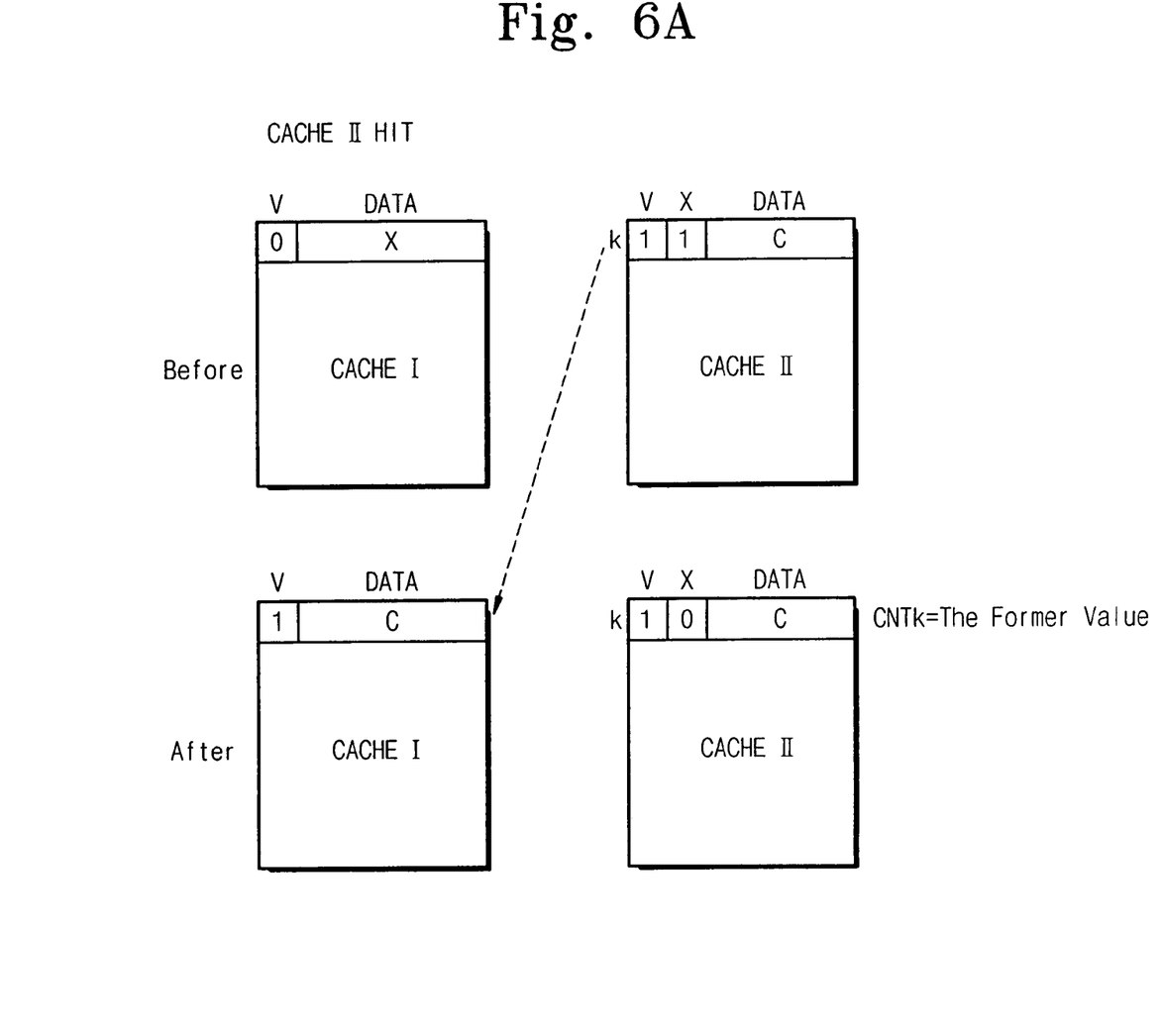
FIG. 6A illustrates the case in which data to be read out of the cache memories by a processor is hit in the secondary cache.
Figure 6B:
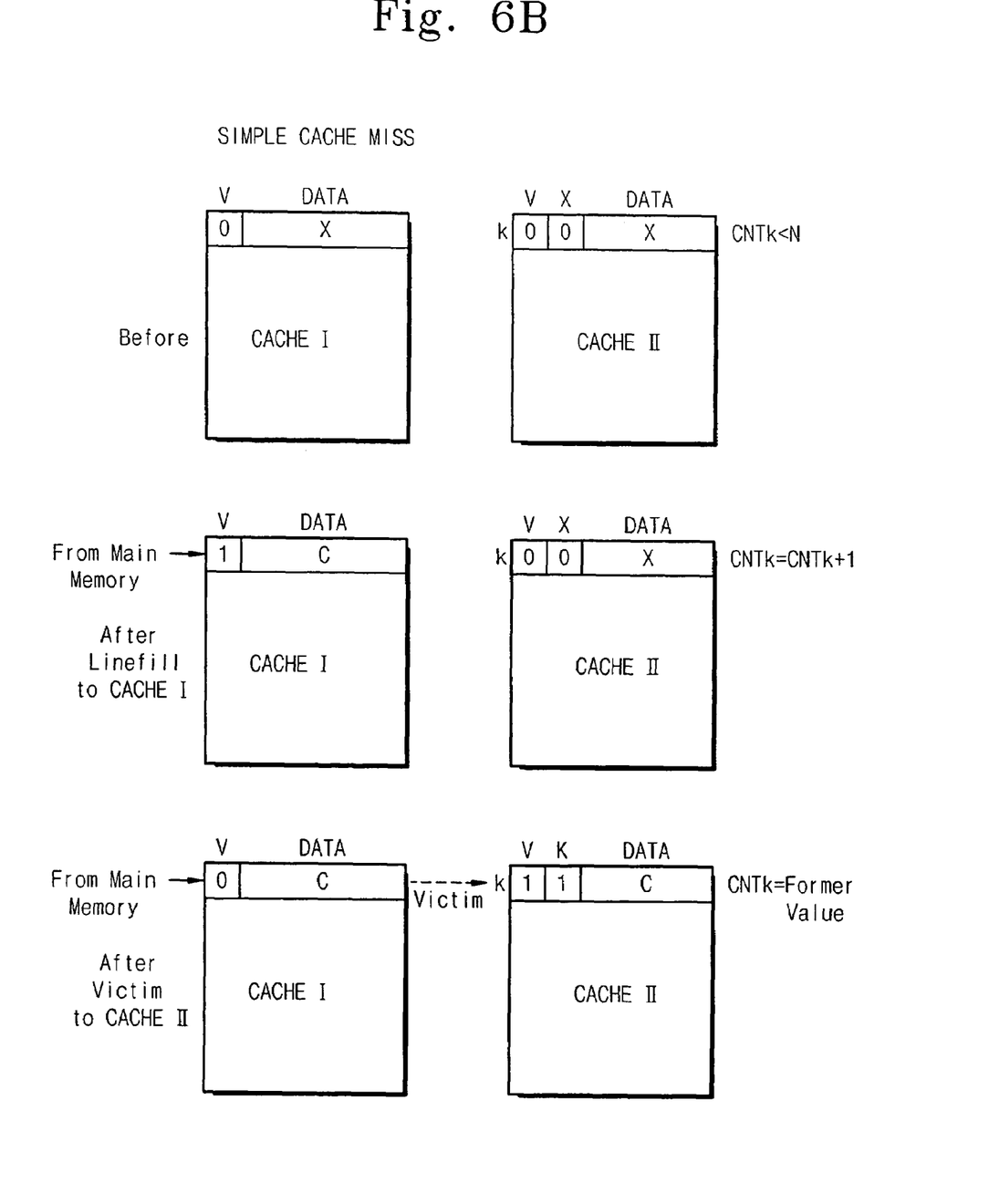
FIG. 6B illustrates the case in which data to be read out of the cache memories by a processor is missed in the secondary cache.
Figure 6C:
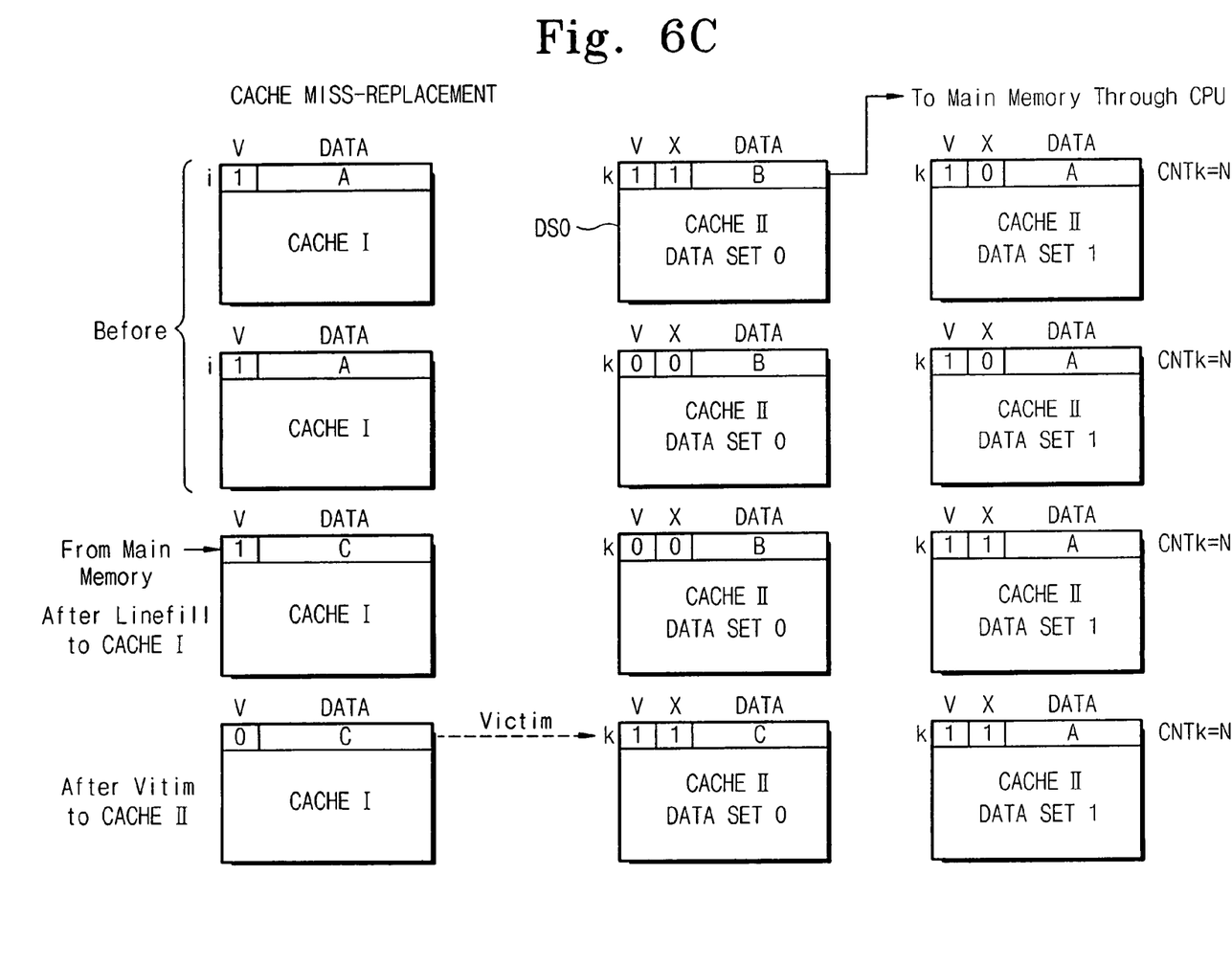
FIG. 6C illustrates the case of performing a replacement operation in the secondary cache when data to be read out of the cache memories by a processor has been missed in the secondary cache.

FIGS. 6A through 6C show conditions of CACHE I and CACHE II when the data C is read out from the cache memories.

In the case in which a "cache hit" occurs in CACHE II for the data C to be read therefrom, referring to FIG. 6A, if the data C is missed in CACHE I while hit in CACHE II during access to the cache memories by the CPU 20, the data C stored in the k'th line of CACHE II is transferred to CACHE I and stored therein. After transferring the data C from CACHE II to CACHE I, the valid status bit Vi in CACHE I is 1. As the data C is present simultaneously in CACHE I and CACHE II, the exclusive status bit Xk of CACHE II becomes logically 0. Also, a counter CNTk corresponding to the k'th line of CACHE II holding the data C maintains the former value.

In the case in which a "cache miss" (H/Mk=0) occurs in CACHE I and CACHE II for the data C to be read from them and the counter CNTk corresponding to the index address (INDEX=k) is not saturated, referring to FIG. 6B, the data C provided from the CPU 20 is written in CACHE I and CACAHE II sequentially. That is, the data C is stored in CACHE II after being stored in CACHE I. In similar fashion to that described above, the data C provided from the main memory 10, corresponding to the index address (INDEX=k) provided from the CPU 20, is sequentially stored in the data RAMs of CACHE I and CACHE II. After storing the data C in CACHE I and CACHE II, the valid status bit Vi of CACHE I becomes 1 and the valid status bit Vk of CACHE II also becomes 1. As the data C is present simultaneously in CACHE I and CACHE II, the exclusive status bit Xk of CACHE II becomes logical 0. Also, a counter CNTk corresponding to the k'th line of CACHE II holding the data C generates a counting signal increasing by 1 (CNTk=CNTk+1).

In the case in which "cache miss" (H/Mk=0) occurs in CACHE I and CACHE II for the data C to be read out of them, CACHE I is full with data, and the counter CNTk corresponding to the index address (INDEX=k) is saturated (CNTk=N), referring to FIG. 6C, an operation for cache miss-replacement is carried out. First, in order to obtain space for data by sending one of data stored in CACHE II, one of valid data stored in lines of data sets corresponding to the index address (INDEX=k) in CACHE II not in CACHE I, i.e., the exclusive status bit Xk=1, is transferred to the main memory 10. Selecting one, to be transferred to the main memory 10, among the valid data that are assigned to Xk=1 in CACHE II and absent in CACHE I, is determined by an appropriate one of techniques such as LRU (least-Recently-Used) or random replacement, which are well known. The LRU approach can be employed for smaller set number and cache size, or random replacement can be employed for larger set number and cache size.

In the present embodiment, the data B among the valid data of Xk=1, which is stored in the first data set DS0, moves into the main memory 10. Thus, the data B is now invalid in CACHE II (Vk=1) and thereby a space for data is created in CACHE II. Then, the data A stored in CACHE I is transferred to the second data set DS1 of CACHE II by means of a victim operation shown in FIGS. 4A and 4B. As a result, CACHE I also has a space for data because the data A is invalid. At this time, the exclusive status bit Xk corresponding to the data A stored in the second data set DS1 of CACHE II changes to 1. Through the aforementioned procedure, vacant spaces for data are prepared in CACHE I and CACHE II. The counter corresponding to the index address (INDEX=k) generates a counting value decreasing by 1 (CNTk=N−1).

Continuously, the data C provided from the CPU 20 sequentially moves into CACHE I and CACHE II in order. That is, the data C is stored in CACHE II just after being stored in CACHE I. After storing the data C in CACHE I and CACHE II, the valid status bit Vi of CACHE I becomes 1 and the valid status bit Vk of CACHE II also becomes 1. As the data C is present simultaneously in CACHE I and CACHE II, the exclusive status bit Xk of CACHE II becomes logical 0. As new data, i.e., the data C, has come into CACHE II, the counter CNTk corresponding to the k'th line of CACHE II holding the data C generates a counting signal increasing by 1 (CNTk=N).

Figure 7:
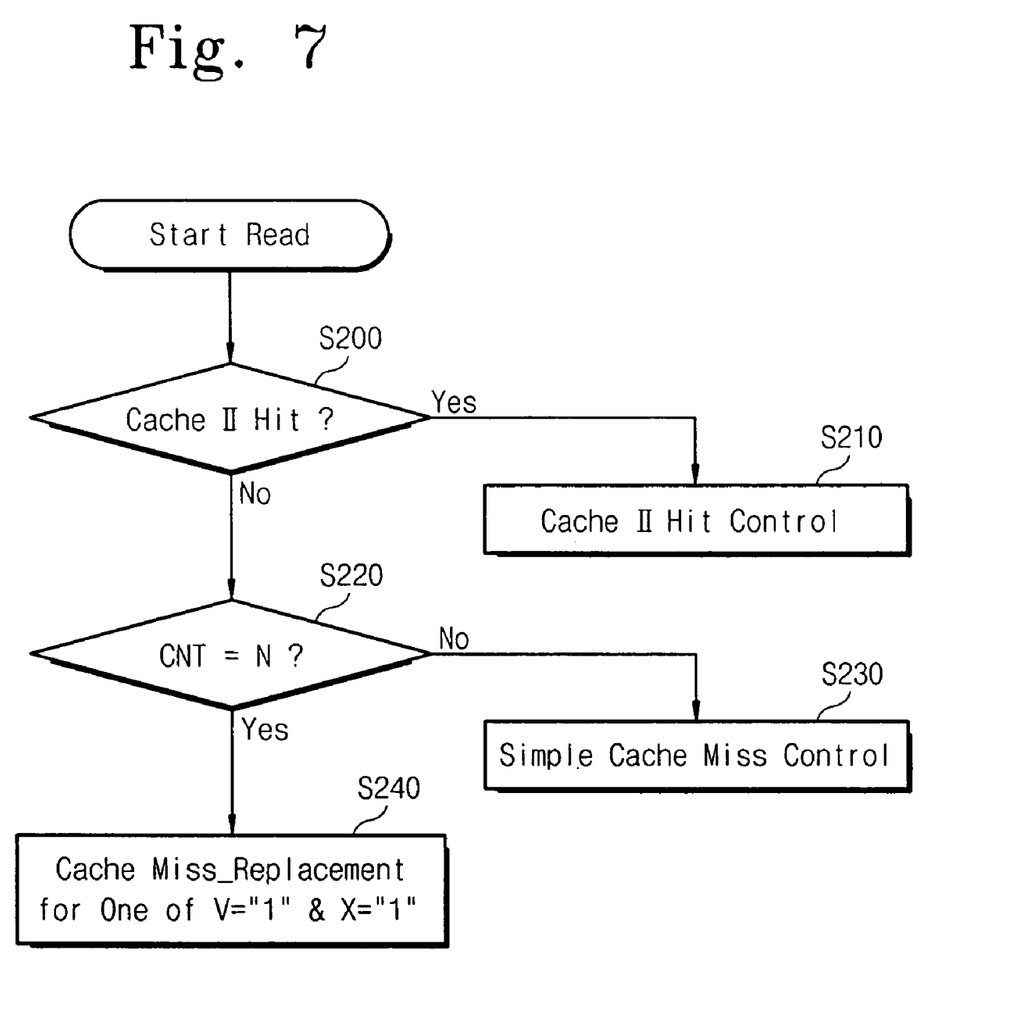
FIG. 7 illustrates a sequential procedure performed in a control logic circuit according to an embodiment of the invention.

FIG. 7 illustrates a sequential procedure performed in the control logic circuit 160 shown in FIG. 3, for reading data from CACHE I and CACHE II. First, the CPU 20 accesses CACHE I. If "cache hit" occurs in CACHE I for data to be accessed by the CPU 20, the data is read out from CACHE I and then provided to the CPU 20. If "cache miss" occurs in CACHE I, the CPU 20 accesses CACHE II.

At a step S200, the control logic circuit 160 checks the hit/miss signals H/M0~H/Mn−1 to determine whether there is "hit" or "miss". The control logic circuit 160 decides "cache hit" when one of H/MO~H/Mn−1 is logical 1, or "cache miss" when one of H/MO~H/Mn−1 is logical 0. If a "cache hit" is detected, at a step S210, the selection signal SEL is generated for designating a data set corresponding to the logical 1 of the hit/miss signals H/M0~H/Mn−1.

On the contrary, if "cache miss" is determined at the step S200, a step S220 checks whether or not a counter corresponding to the current index address is saturated with full counting vales (CNT=N). When the corresponding counter is not saturated, a control operation for the simple cache miss as shown in FIG. 6B is implemented in step S230. When the corresponding counter is saturated, the cache miss-replacement operation is conducted in step S240 by means of the pseudo-LRU as shown in FIG. 6C, in which one of data that is assigned to the valid status bit of 1 and the exclusive status bit of 1 is associated with the cache miss-replacement operation.

The control logic circuit 160 employed in the cache memory system, as stated above, enables the cache miss-replacement operation when a counting value of a counter corresponding to a current index address is N (i.e., the saturation state), without checking the valid status bits of the data sets in order to find a space for new data, at the condition of "cache miss" where the hit/miss signals H/M0~H/Mn−1 are all logical 0. As a result, implementation of decision logic for the cache miss-replacement operation in the control logic circuit 160 is simplified.

Moreover, considering the condition that one of data stored in the secondary cache 30 (i.e., CACHE II) must be transferred into the main memory 10 to write new data therein when all lines of the data sets in the secondary cache 40 are full with valid data (i.e., the counting value is N), and the data to be transferred to the main memory 10 must be stored only in the secondary cache 40 not in the primary cache 30 (i.e., CACHE I) for satisfying the inclusion property of cache, the invention is advantageous to simplify the cache miss-replacement logic and to shorten a running time for the cache miss-replacement operation. As described above, in the embodiment of the invention, since data with the valid status bit of 1 and with the exclusive status bit of 1 is transferred to the main memory 10 from the secondary cache 40, there is no need of accessing the primary cache 30 in selecting the data stored only in the secondary cache 40 not in the primary cache 30.

In addition, the control logic circuit 160 is helpful in enhancing performance of the cache miss-replacement function by means of the pseudo-LRU even though the number of data sets of the secondary cache 40 increases, because it operates independently with the primary cache 30. It is possible to construct the cache miss-replacement logic with a minimum hardware size.

As described above, the invention simplifies control logic for the secondary cache when the number of data sets of an set-associative cache system increases to offset a decrease of hit ratio due to a smaller size for the secondary cache that is embedded on a chip with a microprocessor.

While the present invention has been described in detail with reference to the preferred embodiment thereof, it should be understood to those skilled in the art that various changes, substitutions and alterations can be made hereto without departing from the scope of the invention as defined by the appended claims.

What is claimed is:

1. A multi-level cache system comprising:
a primary cache for storing tag addresses and data; and
a secondary cache being accessed by a processor later than the primary cache, the secondary cache including:
a data memory for storing data in a plurality of data sets;
a tag memory for storing tags in a plurality of tag sets, each tag set including: a field for storing the tags; a field for storing first information representing validity of corresponding data stored in the data memory, and a field for storing second information representing whether the corresponding data is stored in the primary cache; and
a control logic circuit for conducting a control operation with reference to the first and second information when an access by the processor is in a miss state for the secondary caches, the control logic circuit selecting data in response to the first information, the second information, a hit/miss signal, and a counter signal; wherein:
each of the tag sets further comprises a plurality of tag lines, and each of the data sets comprises a plurality of data lines that correspond to the tag lines, the lines corresponding between the tag and data sets being designated by a same index address;
the secondary cache further comprises a plurality of counters, each counter corresponding to a tag line for counting the number of valid data stored in the data lines corresponding to the index address, and for generating the counter signal;
the control logic circuit conducts a first cache-miss control operation by selecting data stored in the data memory not in the primary cache as replaceable data with reference to the second information when the counter corresponding to the tag line that corresponds to the data stored generates the counter signal having a counting value that is a threshold value, the threshold value for indicating that the secondary cache is saturated with valid data, and conducts a second cache-miss control operation with reference to the first and second information when the counter generates the counter signal having the counting value that is less than the threshold value, and
the counting value of the counter is incremented when a new data line is received by the secondary cache, and decremented when data is removed from the second data cache.

2. The multi-level cache system of claim 1, wherein each of the tag sets generates a hit/miss signal after comparing a tag provided from the processor with the tag stored in the line designated by the index address.

3. The multi-level cache system of claim 2, wherein the control logic circuit determines a cache miss when the hit/miss signals are all in a miss state.

4. The multi-level cache system of claim 1, wherein new data is written in the data line storing invalid data among the data of the data memory, with reference to the first information, in a cache miss condition and when the counter corresponding to the tag line that corresponds to the data line is not saturated.

5. The multi-level cache system of claim 1, wherein each of the first and second information is composed of 1-bit binary data.

6. The multi-level cache system of claim 5, wherein the first information is logical 1 when the corresponding data of the data memory is valid, or logical 0 when the corresponding data of the data memory is invalid.

7. The multi-level cache system of claim 5, wherein the second information is logical 1 when the corresponding data of the data memory is present in the primary cache, or logical 0 when the corresponding data of the data memory is absent in the primary cache.

8. The multi-level cache system of claim 1, wherein the secondary cache is composed of a set-associative architecture.

9. The multi-level cache system of claim 1, wherein the primary cache comprises:
   a data memory for storing data corresponding to the tag; and
   a tag memory for storing tags, including a field for storing the tags and a field for storing information representing validity of corresponding data stored in a data memory.

* * * * *